(12) United States Patent  (10) Patent No.: US 7,574,805 B1
Lindroth  (45) Date of Patent: Aug. 18, 2009

(54) ROTATING BRANCH TRIMMER (76) Inventor: Ulf Lindroth, 11305 7th St. East, Treasure Island, FL (US) 33706

( * ) Notice: Subject to any disclaimer, the term of this patent is extended or adjusted under 35 U.S.C. 154(b) by 79 days.

(21) Appl. No.: 11/610,260

(22) Filed: Dec. 13, 2006

(51) Int. Cl.
B26B 13/26 (2006.01)
(52) U.S. Cl. .............................. 30/250; 30/192; 30/249
(58) Field of Classification Search ........... 30/244–271, 30/192; 81/300, 329, 341, 342, 385; 74/501.5 R, 74/500.5
See application file for complete search history.

(56) References Cited

U.S. PATENT DOCUMENTS

| | | | | |
|---|---|---|---|---|
| 248,996 | A * | 11/1881 | Burdick | 83/580 |
| 1,395,758 | A * | 11/1921 | Maszczyk | 30/250 |
| 1,592,017 | A * | 7/1926 | Van Campen | 30/180 |
| 2,497,211 | A * | 2/1950 | Decarlo | 30/247 |
| 2,927,373 | A | 3/1960 | Taube | |
| 3,572,192 | A * | 3/1971 | Juras | 81/383.5 |
| 3,584,381 | A | 6/1971 | Jamison | |
| 3,885,309 | A * | 5/1975 | Lund et al. | 30/250 |
| 4,028,971 | A * | 6/1977 | Budrose | 81/383.5 |
| 5,159,757 | A | 11/1992 | Weid et al. | |
| 5,226,236 | A * | 7/1993 | Harrington, III | 30/134 |
| 5,339,712 | A * | 8/1994 | Keyvani | 81/416 |
| 5,659,959 | A * | 8/1997 | Parlowski | 30/232 |
| 5,689,888 | A * | 11/1997 | Linden | 30/250 |
| 5,697,159 | A | 12/1997 | Linden | |
| 5,960,546 | A | 10/1999 | Cooke et al. | |
| 6,901,695 | B2 | 6/2005 | Lindroth | |
| 7,328,513 | B1 * | 2/2008 | Yang | 30/178 |
| 2002/0020067 | A1 * | 2/2002 | Silver et al. | 30/226 |

* cited by examiner

Primary Examiner—Hwei-Siu C Payer
(74) Attorney, Agent, or Firm—Larson and Larson PA; Frank Liebenow (57) ABSTRACT A pruning device is disclosed including a first handle coupled at a first end to a first jaw and a second handle, a first end of the second handle coupled to a second jaw. The first jaw and the second jaw are pivotally connected. A rotatable handle is interfaced to a second end of the first handle such that it rotates with respect to the second handle. A first end of a flexible medium is affixed to the second handle and a second end of the flexible medium affixed to the rotatable handle, whereas turning of the rotatable handle winds the flexible medium around the rotatable handle and the second handle is pulled towards the first handle.

19 Claims, 8 Drawing Sheets

ROTATING BRANCH TRIMMER

BACKGROUND OF THE INVENTION

1. Field of the Invention

This invention relates to the field of trimming trees and branches and more particularly to a device for trimming branches.

2. Description of the Related Art

As trees and shrubs grow, it is important to regularly trim them to keep them healthy and well groomed. Trimming is performed by cutting dead branches or branches that have grown too much or irregularly.

There are many trimmers already in use in the market. The simplest trimmer or hand tool has a pair of cutting blades similar to a scissor. Often the cutting blades are curved to improve cutting action, especially for green (wet) branches. A user opens the blades, surrounds the branch to be cut and applies force, closing the handles and cutting the branch.

A modified pivoted hand tool is described in U.S. Pat. No. 5,697,159 to Linden. This hand tool is an improvement over the common everyday prune tool. In the described hand tool, the lower handle rotates as the handles are compressed between the user's palm and fingers. The purpose is to improve leverage and comfort when cutting branches close to the user. The described hand tool works well for smaller branches when they are located within reach of a person using the tool, but is not adequate for larger branches or when the branches are out of reach of the person using the tools.

In response to this need, several extension tools have been deployed that let the person using such cut branches that are outside of their unassisted reach. One example of such is described in U.S. Pat. No. 3,584,381 to Jamison. The described tool has an extension handle that has an inner shaft within a pole. The pole is coupled to one cutting blade and the inner shaft to the other so that pulling or pushing the inner shaft with respect to the pole opens and closes the cutting blades. The inner shaft is connected to a hydraulic cylinder that is connected to a fluid pump. This tool is heavy and includes an expensive and complex system of extension poles, motors and hydraulics.

Another solution to the problem is presented in U.S. Pat. No. 4,707,917 to Westover, et al. The tool of this patent uses rotation of the extension pole to turn a screw that urges a base member to push the branch against a cutting blade, much like having the branch and a cutting blade in a vise. This tool requires many turns of the handle to move the base member far enough to cut a branch and has a release arm so the user doesn't have to turn the handle the same number of turns in the opposite direction in order to re-open the tool. This tool is not efficient when cutting many different branch sizes, especially for smaller branches which require the most number of turns of the handle.

Another pruning device is described in U.S. Pat. No. 5,960,546 to Cooke, et al. This device has a hollow extension pole with a cord or wire passing within. The cord is attached to the cutting system so that, when the extension pole is held stationary and the cord is pulled, the cutting blades engage and cut the branch. This device requires two handed operation, one to hold the extension pole and the other to pull the cord. Because of a lack of leverage, it is often difficult to support a heavy extension pole with one hand while using the other hand to pull on a cord.

What is needed is a simple pruning device that can cut various sized branches or other objects with simple mechanical movement.

SUMMARY OF THE INVENTION

It is an objective of the present invention to provide a pruning device that cuts branches.

It is another objective of the present invention to provide a pruning device that cuts branches that are outside of the normal reach of the user.

It is another objective of the present invention to provide a pruning device that cuts branches that are outside of the normal reach of the user using a turning motion.

It is another objective of the present invention to provide a pruning device that cuts branches that are outside of the normal reach of the user using a turning motion utilizing a low number of rotations.

It is another objective of the present invention to provide a pruning device that cuts branches that are outside of the normal reach of the user when attached to a simple extension pole, whereas the user can keep both hands on the extension pole while twisting the extension pole to cut the branches.

In one embodiment, a pruning device is disclosed including a first handle coupled at a first end to a first jaw and a second handle, a first end of the second handle coupled to a second jaw. The first jaw and the second jaw are pivotally connected. A rotatable handle is interfaced to a second end of the first handle such that it rotates with respect to the second handle. A first end of a flexible medium is affixed to the second handle and a second end of the flexible medium affixed to the rotatable handle, whereas turning of the rotatable handle winds the flexible medium around the rotatable handle and the second handle is pulled towards the first handle, thereby cutting any object held between the jaws.

In another embodiment, a method of pruning branches is disclosed including providing a pruning device with a first handle coupled at a first end to a first jaw and a second handle, a first end of the second handle coupled at to a second jaw. The first jaw and the second jaw pivotally connected. A rotatable handle is rotatably interfaced to a second end of the first handle and an extension pole is adapted to an end of the rotatable handle. A first end of a flexible medium is affixed to the second handle and a second end of the flexible medium affixed to the rotatable handle, whereas turning of the rotatable handle winds the flexible medium around the rotatable handle and the second handle is pulled towards the first handle. The method continues with holding the extension pole and positioning an object to be pruned between the first jaw and second jaw of the pruning device then twisting the extension pole, thereby winding the flexible medium around the handle, pulling the second handle towards the first handle and cutting the object to be pruned.

In another embodiment, a pruning device is disclosed including a first handle coupled at a first end to a first jaw and a second handle, a first end of the second handle coupled to a second jaw. The first jaw and the second jaw are pivotally connected. A rotatable handle is interfaced to a second end of the first handle so that it freely rotates with respect to the first handle. A mechanism for urging the first handle towards the second handle in response to the rotatable handle being turned is adapted between the first and second handles, whereas turning of the rotatable handle pulls the second handle toward the first handle.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to the presently preferred embodiments of the invention, examples of which are illustrated in the accompanying drawings. Throughout the following detailed description, the same reference numerals refer to the same elements in all figures. The pruning device of the present invention can be used to prune or cut branches or limbs or similar objects such as cables, wires and wood located either within reach or out of reach of a user. The pruning device of the present invention can be used with or without an extension pole.

Figure 1:
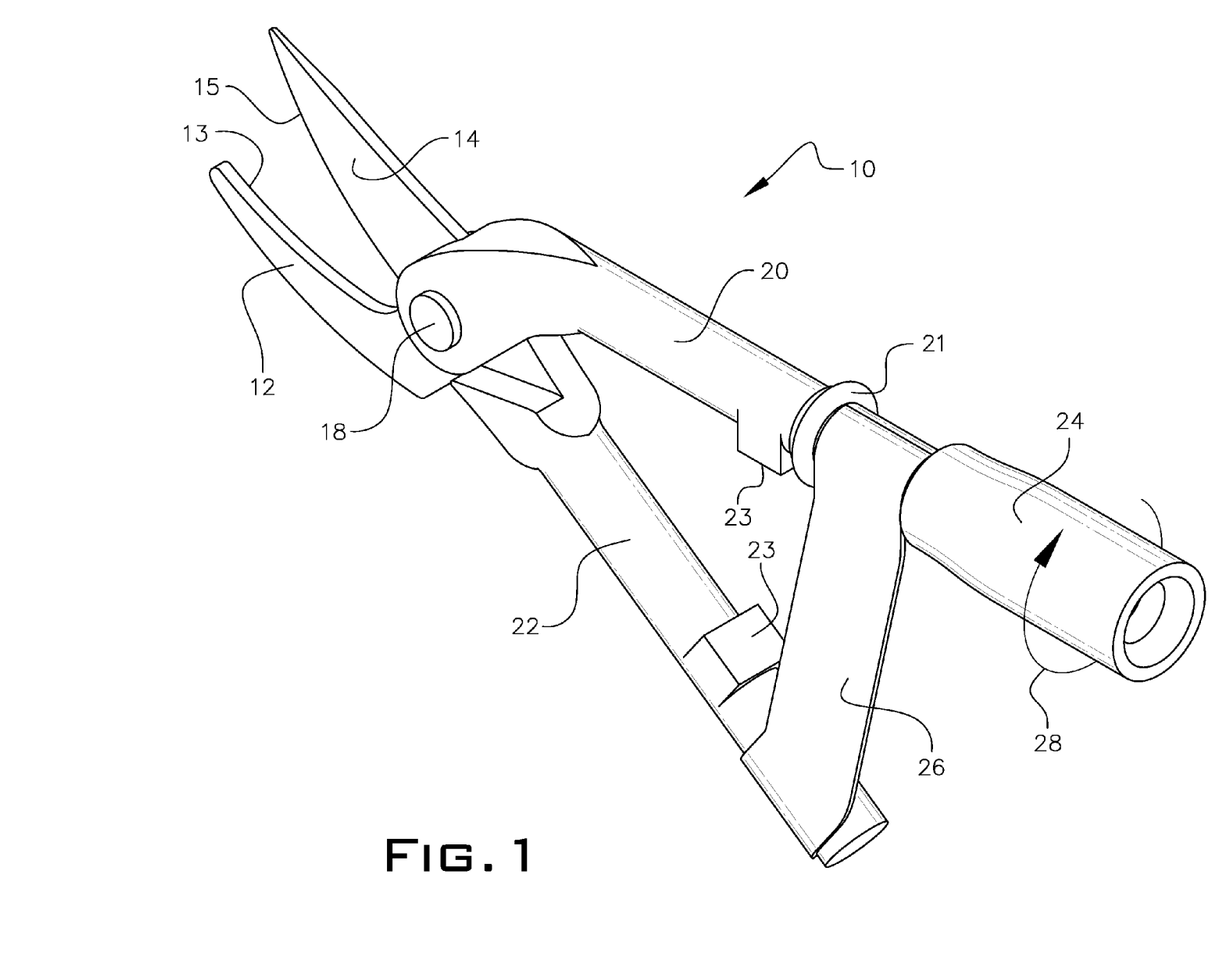
FIG. 1 illustrates an isometric view of a pruning device of a first embodiment of the present invention.

Referring to FIG. 1, an isometric view of a pruning device of a first embodiment of the present invention will be described. The pruning device 10 comprises two pivotally connected levers (20/12 22/14) connected by a pivot 18 for scissor action. The levers operate between an open position (shown in FIG. 1 and a closed position (shown in FIG. 2). The first lever has a first handle end 20 and a jaw 12 with a cutting edge 13. The second lever has a second handle 22 and a second jaw 14, also with a cutting edge 15. Acting as a scissor, an object placed between the cutting blades 13/15 is cut when a closing force is applied to the handles 20/22. The pruning device 10 also includes a wrapping mechanism with a rotatable handle extension 24 and a flexible medium 26. The rotatable handle extension 24 is attached to the first handle 20 by an interface 21 such as a bearing that permits the rotatable handle extension 24 to rotate freely without rotating the first handle 20. The flexible medium 26 is securely attached to the rotatable handle 24 and securely attached to the second handle 22 so that as the rotatable handle 24 is turned 28, the flexible medium wraps around the rotatable handle 24, thereby urging the second handle 22 to close toward the first handle 20 and applying a cutting force between the blades 13/15, thereby cutting any object situated between the blades 13/15.

In the preferred embodiment, the flexible medium is a sturdy cloth strap made from, for example, nylon. In alternate embodiments, the flexible medium is a sturdy rope made from, for example, nylon. In yet another embodiment, the flexible medium is made from sheet steel that is thin enough to be flexible, yet thick enough to withstand repeated bending operations. An alternate to this embodiment is to use spring steel so that after the object is cut, the spring steel urges the pruning device 10 back into the open position.

In some embodiments, one or two stops 23 are provided to prevent the handles 20/22 from being overly forced together, thereby reducing the possibility of bending of breaking the handles.

Figure 2:
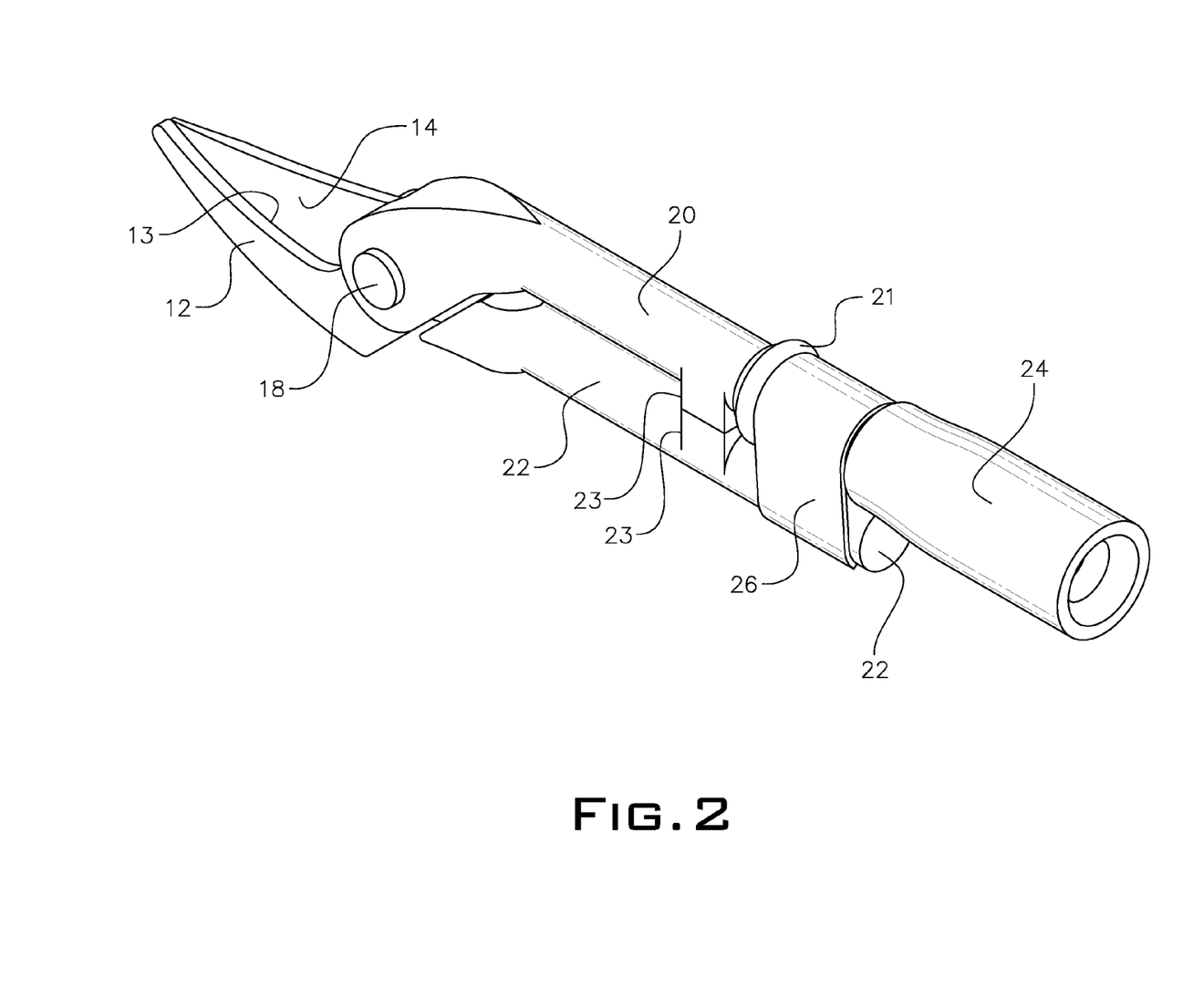
FIG. 2 illustrates an isometric view of a pruning device of a first embodiment of the present invention in a closed position.

FIG. 2 shows an isometric view of a pruning device of a first embodiment of the present invention in a closed position. In this, the flexible medium 26 is securely attached to the rotatable handle 24 and to the second handle 22 and the rotatable handle 24 was turned 28 enough for the flexible medium to completely wrap around the rotatable handle 24, thereby closing the second handle 22 to the first handle 20 and any object that was situated between the blades has been cut.

Figure 3:
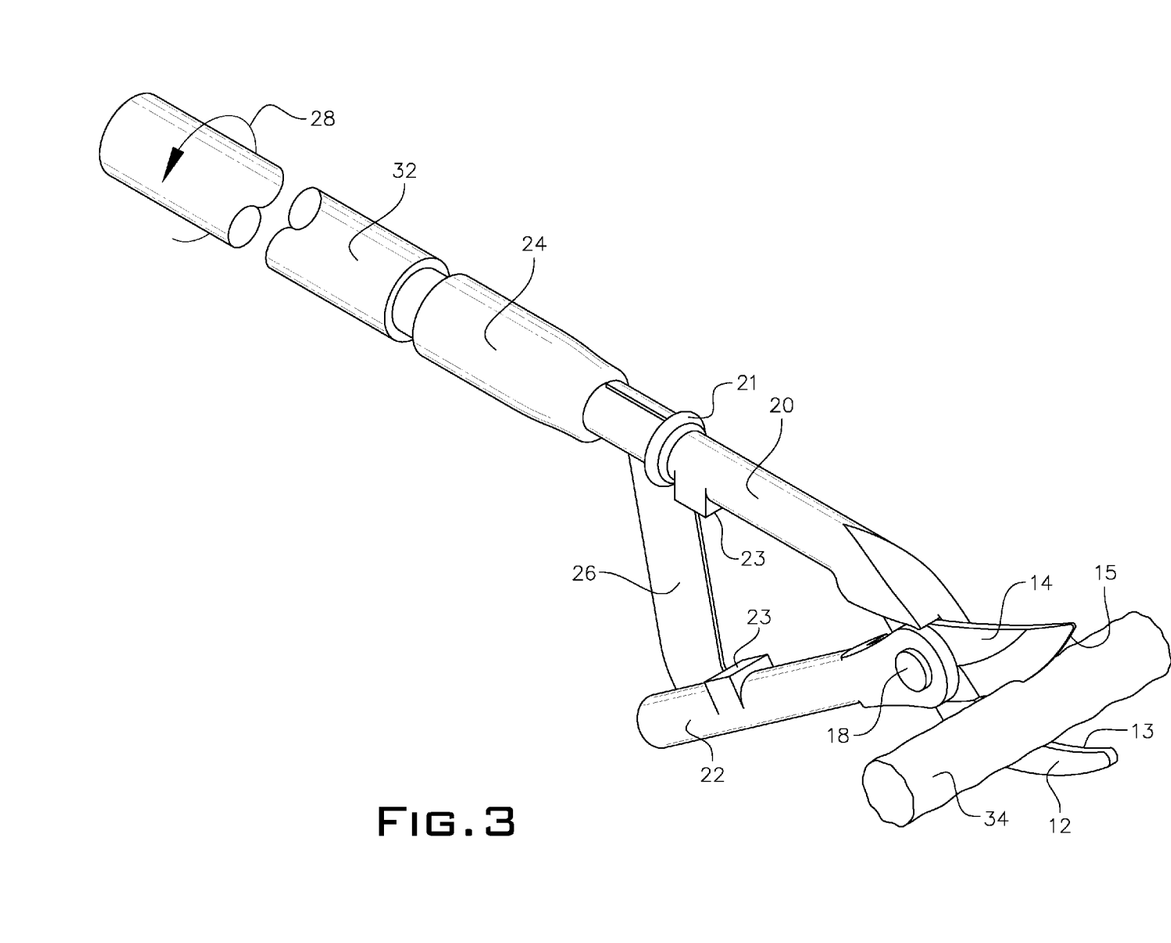
FIG. 3 illustrates an isometric view of a pruning device of a first embodiment of the present invention cutting a branch.

Referring to FIG. 3, an isometric view of a pruning device of a first embodiment of the present invention cutting a branch will be described. The branch 34 (or other object) is wedged between the jaws 12/14. An extension pole 32 is part of or coupled to the rotatable handle extension 24 and is turned in the direction of the arrow 28, thereby twisting the flexible medium 26 around the rotatable handle and drawing the first handle 20 and second handle 22 toward each other, thereby through scissor action, cutting the object 34. It should be noted that the preferred rotation is shown 28 because many extension poles 32 are designed to screw into brooms, paint rollers and devices like the present invention in a clockwise direction. Therefore, the clockwise rotation 28 will tighten this connection rather than loosen or break such. Otherwise, the rotation can be in the opposite direction of the arrow 28 if another connection method is used or if the extension pole 32 is a continuation of the rotatable handle 24.

Figure 4:
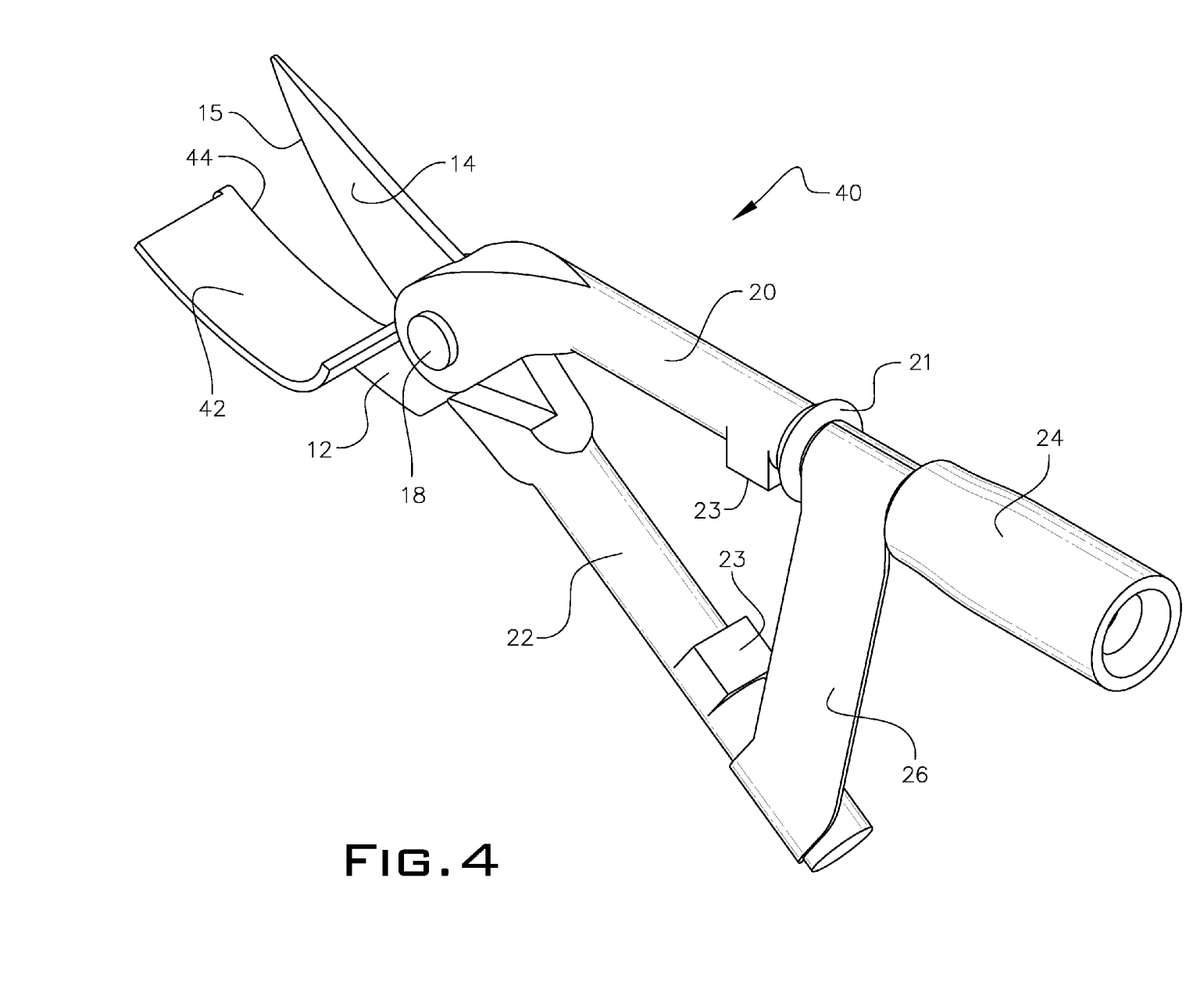
FIG. 4 illustrates an isometric view of a pruning device of a first embodiment of the present invention including a twist shield.

Referring to FIG. 4, an isometric view of a pruning device of a first embodiment of the present invention including a twist shield will be described. In this embodiment, a pruning device 40 is shown that is similar to the pruning device 10 shown in the prior figures with the addition of a twist shield 42. The twist shield 42 is bonded to or part of the first jaw 12. It is preferred that the twist shield 42 and the first jaw 12 interface along the cutting edge 44, but in alternate embodiments, the twist shield 42 is bonded to or extends from other surfaces of the first jaw 12. The object being cut 34 rests on the twist shield 42 and, as the rotatable handle is turned, the twist shield 42 wedges against the object being cut 34 and reduces the amount of rotation or skewing of the jaws 12/14.

Figure 5:
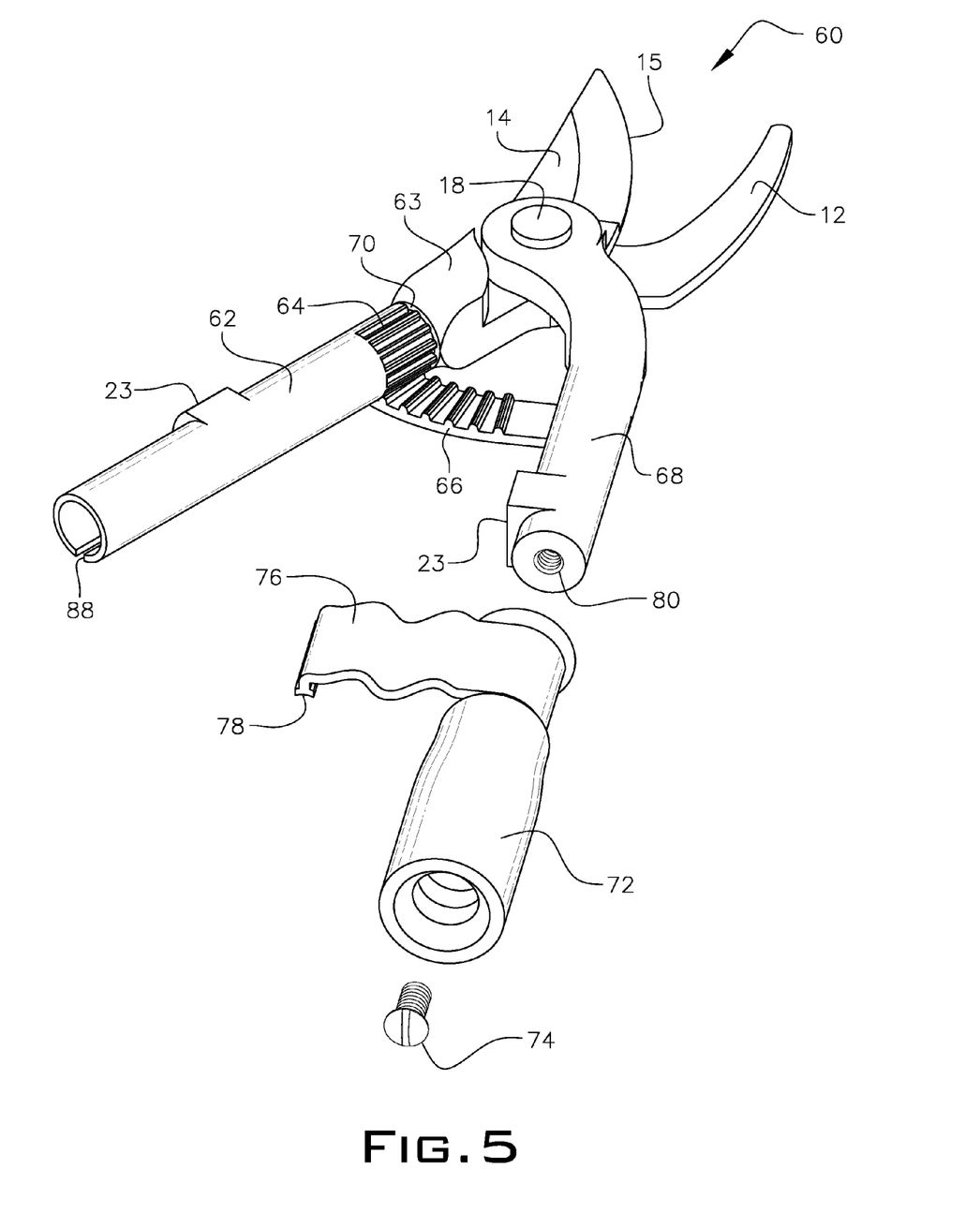
FIG. 5 illustrates an isometric view of a pruning device of a second embodiment of the present invention.

Referring to FIG. 5, an isometric view of a pruning device of a second embodiment of the present invention will be described. The pruning device 60 of this embodiment works in the same manner as the previous embodiment but in addition to the flexible medium 26 for urging the handles 20/22 toward each other, a gear system is used. In this example, a rack 66 and pinion 64 gear is used. The pinion is attached to or formed on the rotatable portion 62 of the first handle 63 and the rack 66 is attached to or formed with the second handle 68. In this embodiment, the rotatable interface 70 is closer to the pivot point 18, though the rack 66 and pinion 64 are positionable at other points on the handles 63/68. In some embodiments, the flexible medium 76 and spool 72 are removable components such that the pruning device 60 is usable as a hand tool before the spool 72 and flexible medium 76 are attached. In this embodiment, the spool 72 is rotatably attached to the handle 68 by a fastener such as a screw 74 that threads into a threaded hole 80. To permit the spool 72 to rotate, the threads of the hole 80 aren't as deep in the handle 68 as the length of the fastener or screw 74, thereby, after tightening, the head of the fastener or screw 74 doesn't keep the spool 72 from turning. The loose end 78 of the flexible medium, which is enlarged at the loose end 78 by, for example, doubling it over and sewing it onto itself. Before fastening the spool 72 to the handle 68, the loose end 78 is inserted into a slot 88 in the hollow end of the rotatable portion 62 of the first handle 63 and the flexible medium 76 is partially wrapped around the rotatable portion 62 of the first handle 63. When the extension pole turns the spool 72, the flexible medium 76 wraps around the spool, both urging the rotatable portion 62 of the first handle 63 towards the second handle 68 and turning the handle 63, thereby turning the pinion 64 along the rack 66. Both actions urge the handles 62/63/68 toward each other, thereby cutting an object located between the jaws 12/14. In other embodiments, the spool is attached by other rotatable mechanisms such as a rivet or snap. In some embodiments, the spool 72 is permanently rotatably affixed to the handle 68 and the flexible medium is permanently affixed to the rotatable portion 62 of the first handle 63. In some embodiments, the flexible medium is affixed to the rotatable portion 62 of the first handle 63 by other removable mechanisms such as a snap or button.

Figure 6:
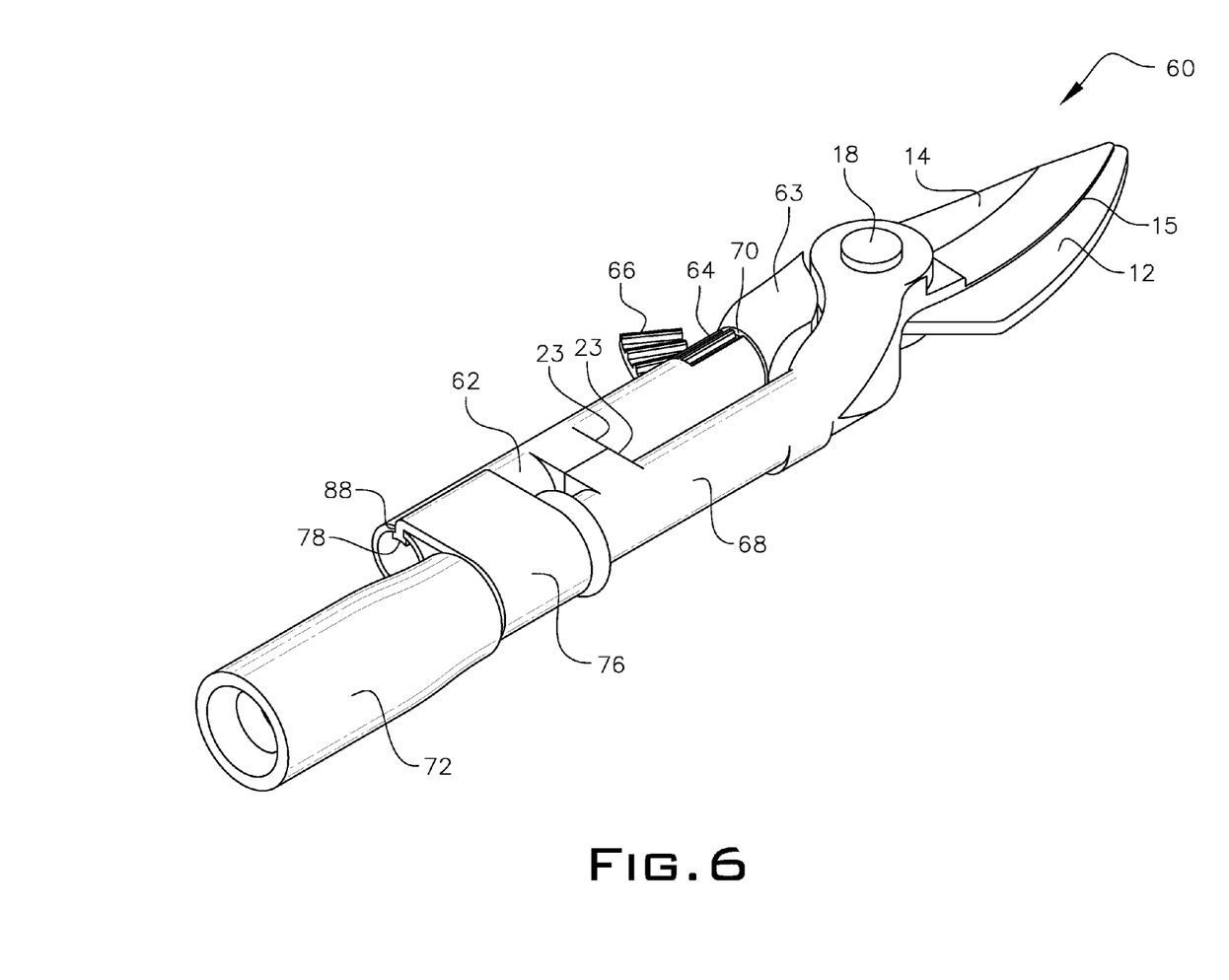
FIG. 6 illustrates an isometric view of a pruning device of a second embodiment of the present invention in a closed position.

Referring to FIG. 6, an isometric view of a pruning device of a second embodiment of the present invention in a closed position will be described. In this view, the spool 72 has been turned and the rotatable portion 62 of the first handle 63 has been turned and the pinion 64 had drawn the rack 66 toward the rotatable handle 62, thereby the handles 62/63/68 are urged together and any object situated between the jaws 12/14 is cut. It should be noted that other gear systems are possible without veering from the present invention. Also, in some embodiments a twist shield 42 is attached to one of the jaws 12/14.

Figure 7:
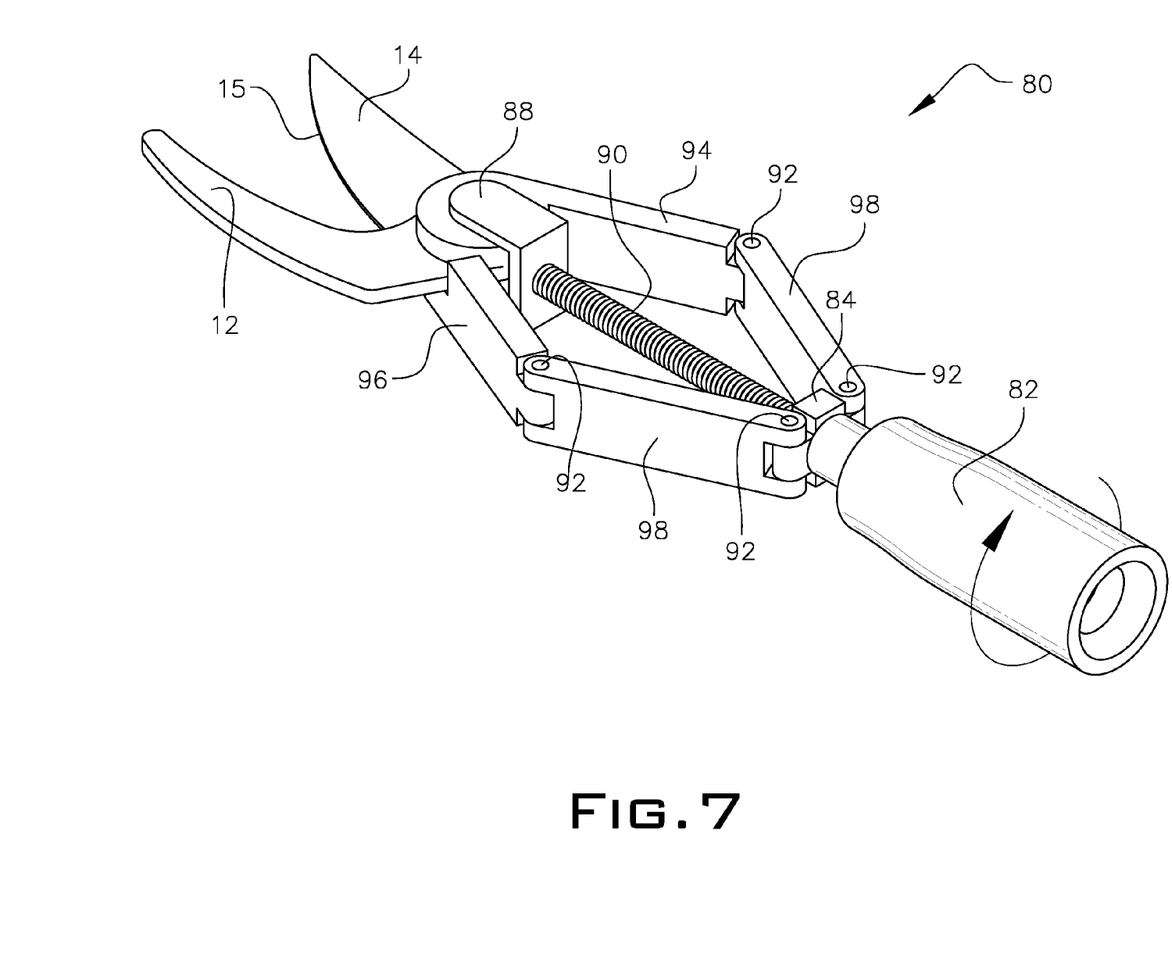
FIG. 7 illustrates an isometric view of a pruning device of a third embodiment of the present invention.

Referring to FIG. 7, an isometric view of a pruning device of a third embodiment of the present invention will be described. In this embodiment, a pruning device 80 has a scissor jack mechanism to urge the handles 94/96 together, resulting in closing the jaws 12/14 and cutting any object situated between the jaws 12/14. In this embodiment, a rotatable handle 82 is coupled to a threaded shaft 90 that is rotatably coupled to a base 88 and the base 88 is coupled to the handles 94/96 and jaws 12/14 at the pivot point (not visible). A threaded coupling 84 has mating threads to the threaded shaft 90 and the threaded shaft 90 passes through the threaded coupling 84 so that as the rotatable handle 82 is twisted, the threaded shaft 90 turns and the threaded coupling 84 moves toward or away from the base 88. Linkages 98 are rotatably or bendably coupled at one end to the threaded coupling 84 with pivots 92 and rotatably coupled at the other end to the handles 94/96, also with pivots 92. As the threaded coupling 84 moves away from the base 88, the linkages 98 are pulled, urging the handles 94/96 toward each other, thereby closing the jaws 12/14 and cutting any object held therein. In some embodiments, a twist shield 42 is provided on one of the jaws 12/14.

Figure 8:
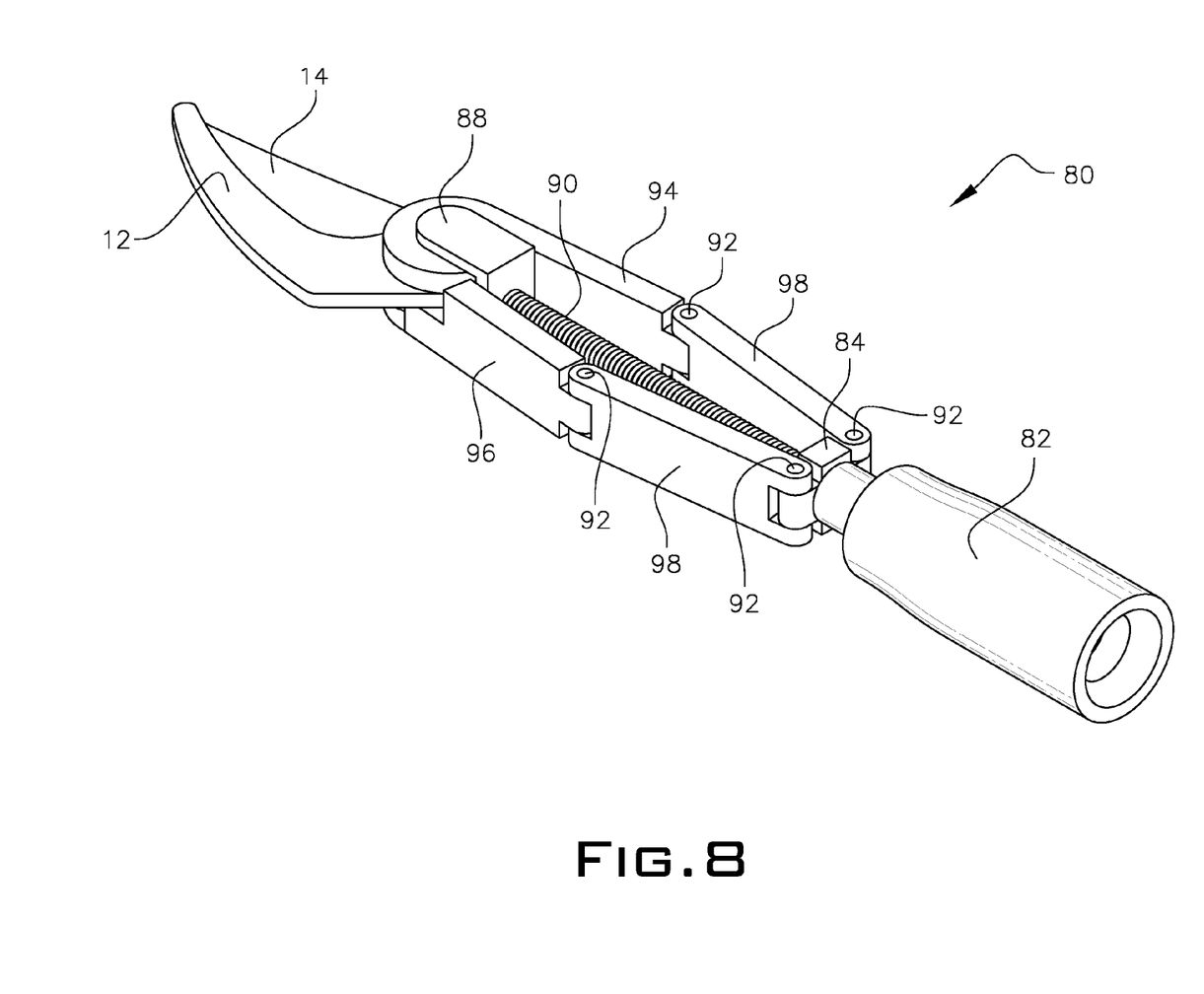
FIG. 8 illustrates an isometric view of a pruning device of a third embodiment of the present invention in a closed position.

Referring to FIG. 8, an isometric view of a pruning device of a third embodiment of the present invention in a closed position will be described. In this view, the threaded coupling 84 is at its furthest distance from the base 88, the linkages 98 have urged the handles 94/96 toward each other, thereby closing the jaws 12/14 and cutting any object held therein.

Although shown with certain handle sizes and diameters, the present invention lends itself to many variations that are all included. Many adjustments are possible affecting the leverage, the number of turns required and the force needed to be exerted to cut a given object. This includes, but is not limited to, the sharpness of the blades (13/15), the length of the handles (20/22), the diameter of the rotatable handle 24, the distance between the pivot 18 and the flexible medium 26 and the diameter of the extension pole where the user provides the twisting force.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A pruning device comprising:
   a first handle having a first end and an opposing second end, the first end coupled to a first jaw;
   a second handle having a first end and an opposing second end, the first end of the second handle coupled to a second jaw, the first jaw and the second jaw pivotally connected;
   a rotatable handle rotatably interfaced to the second end of the first handle; and
   a flexible medium, a first end of the flexible medium affixed to the second end of the second handle and a second end of the flexible medium affixed to the rotatable handle adjacent to the second end of the first handle, whereas turning of the rotatable handle winds the flexible medium around the rotatable handle and the second handle is pulled towards the first handle.

2. The pruning device of claim 1, wherein the flexible medium is a cloth strap.

3. The pruning of device claim 1, wherein the flexible medium is a rope.

4. The pruning of device claim 1, wherein the rotatable handle is adapted to accept an extension pole.

5. The pruning device of claim 1, wherein the rotatable handle forms an extension pole.

6. The pruning device of claim 1, further comprising a twist shield adapted to the first jaw.

7. A method of pruning branches comprising:
   providing a pruning device, the pruning device comprising:
      a first handle having a first end and an opposing second end, the first end coupled to a first jaw;
      a second handle having a first end and an opposing second end, the first end of the second handle coupled to a second jaw, the first jaw and the second jaw pivotally connected;
      a rotatable handle rotatably interfaced to the second end of the first handle;
      an extension pole adapted to an end of the rotatable handle; and
      a flexible medium, a first end of the flexible medium affixed to the second end of the second handle and a second end of the flexible medium affixed to the rotatable handle adjacent to the second end of the first handle;
   holding the extension pole;
   positioning an object to be pruned between the first jaw and the second jaw; and
   twisting the extension pole, thereby winding the flexible medium around the rotatable handle, pulling the second handle towards the first handle and cutting the object to be pruned.

8. The method of pruning branches of claim 7, wherein the providing step comprises providing the flexible medium in the form of a cloth strap.

9. The method of pruning branches of claim 7, wherein the providing step comprises providing the flexible medium in the form of a rope.

10. The method of pruning branches of claim 7, the providing step comprises providing a twist shield adapted to the first jaw, and the step of positioning the object to be pruned between the first jaw and the second jaw includes a step of positioning the object to be pruned against the twist shield.

11. A pruning device comprising:
a first handle having a first end and an opposing second end, the first end coupled to a first jaw;
a second handle having a first end and an opposing second end, the first end of the second handle coupled to a second jaw, the second handle extending distal from the second jaw, the first jaw and the second jaw pivotally connected;
a rotatable handle interfaced to the second end of the first handle by a means for rotation; and
a means for urging the first handle towards the second handle in response to the rotatable handle being turned, whereas turning of the rotatable handle pulls the second handle toward the first handle, the means for urging including a flexible medium, a first end of the flexible medium affixed to the second end of the second handle and a second end of the flexible medium affixed to the rotatable handle adjacent to the second end of the first handle, whereas turning of the rotatable handle results in the flexible medium winding around the rotatable handle, thereby pulling the second handle towards the first handle resulting in the first jaw closing against the second jaw, thereby cutting an object positioned between the first jaw and the second jaw.

12. The pruning device of claim 11, wherein the flexible medium is a cloth strap.

13. The pruning device of claim 11, wherein the flexible medium is a rope.

14. The pruning device of claim 11, wherein the means for urging further includes a gear system.

15. The pruning device of claim 11, wherein the means for urging further includes a rack and pinion gear system having a rack and a pinion, whereby the rack is affixed to the second handle and the pinion is part of the rotatable handle, the gear teeth of the rack interface with gear teeth of the pinion to urge the first handle towards the second handle in response to turning of the rotatable handle; the flexible medium has one end affixed to a spool that is rotatably affixed to an end of the second handle, the other end of the flexible medium is at least partially wound around and affixed to the rotatable handle such that the rotatable handle turns in response to being urged toward the second handle by being pulled by the flexible medium as the spool turns.

16. The pruning device of claim 15, wherein the rotatable spool is adapted to accept an extension pole.

17. The pruning device of claim 11, wherein the rotatable handle is adapted to accept an extension pole.

18. The pruning device of claim 11, further comprising a twist shield adapted to the first jaw.

19. The pruning device of claim 18, wherein the twist shield is welded to the first jaw near a cutting edge.

* * * * *